United States Patent
Hentunen

(10) Patent No.: US 10,083,301 B2
(45) Date of Patent: Sep. 25, 2018

(54) BEHAVIOUR BASED MALWARE PREVENTION

(71) Applicant: F-Secure Corporation, Helsinki (FI)

(72) Inventor: Daavid Hentunen, Helsinki (FI)

(73) Assignee: F-Secure Corporation, Helsinki (FI)

(*) Notice: Subject to any disclaimer, the term of this patent is extended or adjusted under 35 U.S.C. 154(b) by 0 days.

(21) Appl. No.: 15/362,012

(22) Filed: Nov. 28, 2016

(65) Prior Publication Data

US 2017/0161499 A1 Jun. 8, 2017

(30) Foreign Application Priority Data

Dec. 3, 2015 (GB) .................................. 1521386.1

(51) Int. Cl.
| | |
|---|---|
| *G06F 21/00* | (2013.01) |
| *H04L 29/06* | (2006.01) |
| *G06F 21/56* | (2013.01) |
| *G06F 21/55* | (2013.01) |
| *G06F 21/53* | (2013.01) |

(52) U.S. Cl.
CPC .......... *G06F 21/566* (2013.01); *G06F 21/552* (2013.01); *G06F 21/53* (2013.01); *G06F 2221/033* (2013.01); *H05K 999/99* (2013.01)

(58) Field of Classification Search
CPC . G06F 21/566; G06F 21/552; G06F 2221/033
See application file for complete search history.

(56) References Cited

U.S. PATENT DOCUMENTS

| | | | | |
|---|---|---|---|---|
| 8,701,192 B1* | 4/2014 | Glick | ................. | G06F 21/566 726/24 |
| 8,844,038 B2* | 9/2014 | Niemela | ................. | G06F 21/55 713/187 |
| 2003/0200462 A1* | 10/2003 | Munson | .............. | G06F 11/3612 726/26 |
| 2005/0080898 A1* | 4/2005 | Block | ............... | G06F 17/30699 709/225 |
| 2010/0011029 A1* | 1/2010 | Niemela | ................. | G06F 21/55 707/E17.044 |
| 2010/0132041 A1* | 5/2010 | Chu | .................... | H04L 63/1416 726/24 |
| 2011/0182422 A1* | 7/2011 | Anderson | ............... | G06F 21/64 380/30 |
| 2013/0139261 A1* | 5/2013 | Friedrichs | ............... | G06F 21/00 726/23 |

(Continued)

*Primary Examiner* — Lisa C Lewis
(74) *Attorney, Agent, or Firm* — Harrington & Smith

(57) ABSTRACT

A method of detecting malware present on a computer system. A set of applications is predefined as benign, and profiles are provided for respective benign applications. Each profile identifies one or more procedures known to be performed by the associated benign application, each procedure being identified by a characteristic action and one or more expected actions. Behavior of the computer system is monitored to detect performance, by a running application, of a characteristic action of a procedure of a benign application. Upon detection of performance of a characteristic action, the profile provided for the associated benign application is used to detect a deviation from the expected actions of the procedure; and the detection of a deviation is used to identify the running application as malicious or suspicious.

18 Claims, 1 Drawing Sheet

(56) References Cited

U.S. PATENT DOCUMENTS

| | | | |
|---|---|---|---|
| 2014/0041031 A1* | 2/2014 | Prowell | G06F 21/56 |
| | | | 726/23 |
| 2015/0161024 A1 | 6/2015 | Gupta et al. | |
| 2015/0193619 A1* | 7/2015 | Lantz | G06F 21/51 |
| | | | 713/189 |
| 2015/0193775 A1* | 7/2015 | Douglas | G06Q 20/4016 |
| | | | 705/14.23 |
| 2015/0261955 A1* | 9/2015 | Huang | G06F 21/562 |
| | | | 726/23 |
| 2015/0350807 A1* | 12/2015 | Andrews | H04W 4/003 |
| | | | 455/414.2 |

\* cited by examiner

BEHAVIOUR BASED MALWARE PREVENTION

FIELD OF THE INVENTION

The present invention relates to the detection of malware on a computer system using a behavioural analysis approach.

BACKGROUND

The term "malware" is short for malicious software and is used to refer to any software designed to infiltrate or damage a computer system without the owner's informed consent. Malware can include viruses, worms, Trojan horses, rootkits, adware, spyware and any other malicious and unwanted software. Many computer devices, such as desktop personal computers (PCs), laptops, personal data assistants (PDAs) and mobile phones can be at risk from malware. Computer systems running the Windows™ operating system are particularly at risk from malware, but all operating systems will be at some risk. Examples of other operating systems that could be at risk are Mac OS™, Linux™, Android™, iOS™, Windows Mobile™, and Blackberry OS™.

A computer system will generally run a number of benign (i.e. non-malicious) applications. Security applications are often configured to identify such benign applications, for example by comparison of an application installed on the computer system with a database of known benign applications. Once identified, the known benign applications can be excluded from some operations of the security application to free up resources on the computer system.

Malware often attempts to pass itself off as a benign application—for example, a malicious file may be a modified version of a benign file, or contain aspects of a benign file which are known to be checked by security applications. As an alternative, a malware attack may modify a benign application in order to add instructions to the application itself, causing it to execute the malicious code when run.

In yet another type of attack, a code injection may be performed to cause an otherwise benign application to execute malicious instructions. A code injection attack is an attack which causes malicious code to be interpreted or executed by a benign application, without modifying the benign application itself. Such attacks are usually made possible due to incorrect validation of inputs or outputs within the code. A properly crafted input to an incorrectly validated input field can cause the application to treat the input as code to be executed. For example, the PHP "eval( )" function may be used to perform certain operations on data input by the user. However, this function executes any PHP code which is passed to it, so if care is not taken to validate the inputs, then an attacker can input PHP code which will then be executed by the eval( ) function. Other languages and applications have similar vulnerabilities.

Several techniques, such as those used in F-Secure's DeepGuard™ technology, exist to detect code injection or modifications to files as they occur. However, once the code has been inserted into a file, or a malicious file has been created which can pass itself off as a legitimate application, it is more challenging to detect the malicious code.

Behavioural analysis techniques often rely on identifying and examining calls to external libraries such as .dll files, or API calls to other applications—in particular, where an application makes use of encrypted communications, such calls often provide an opportunity to examine the plaintext of the communications. However, sophisticated malware attacks may inject the code from the external library along with the malicious code, or inject other code which allows the application to perform the function itself, in order to remove the need for the call and therefore reduce the opportunity for security applications to analyse the behaviour of the application.

SUMMARY

According to a first aspect of the invention there is provided a method of detecting malware present on a computer system. A set of applications is predefined as benign, and profiles are provided for respective benign applications. Each profile identifies one or more procedures known to be performed by the associated benign application, each procedure being identified by a characteristic action and one or more expected actions. Behaviour of the computer system is monitored to detect performance, by a running application, of a characteristic action of a procedure of a benign application. Upon detection of performance of a characteristic action, the profile provided for the associated benign application is used to detect a deviation from the expected actions of the procedure; and the detection of a deviation is used to identify the running application as malicious or suspicious.

According to a second aspect, there is provided a computer system comprising a memory and a processor. The memory is configured to store a profile for each of a set of benign applications, the profile identifying one or more procedures known to be performed by the associated benign application, each procedure being identified by a characteristic action and one or more expected actions. The processor is configured to:

monitor behaviour of the computer system to detect performance, by a running application, of a characteristic action of a procedure of a benign application;

upon detection of performance of a characteristic action, use the profile provided for the associated benign application to detect a deviation from the expected actions of the procedure; and use the detection of a deviation to identify the running application as malicious or suspicious.

According to a third aspect, there is provided a server comprising a memory and a processor. The memory is configured to store a profile for each of a set of benign applications, the profile identifying one or more procedures known to be performed by the associated benign application, each procedure being identified by a characteristic action and one or more expected actions. The processor is configured to:

receive, from a computer system, results of behaviour monitoring of a running application on the computer system;

upon detection of performance of a characteristic action in said results, use the profile provided for the associated benign application to detect a deviation from the expected actions of the procedure; and use the detection of a deviation to identify the running application as malicious or suspicious;

send to the computer system an indication as to whether the running application is malicious or suspicious.

According to a fourth aspect, there is provided a computer program comprising computer readable code which, when run on a computer system or server, causes the computer system or server to act as a computer system or server according to the second or third aspect, or to perform a method according to the first aspect.

Further embodiments of the invention are presented in the appended claims.

DETAILED DESCRIPTION

In order to provide improved detection of malware that masquerades as a benign application or hides itself using a valid benign application, a system is proposed which makes use of a behaviour profile generated for each of a plurality of known benign applications. For example, the behaviour profile for Microsoft OneDrive™ may identify that the application uses HttpSendRequest API from wininet.dll to perform SLL communications with Microsoft's™ server. The profile may identify that this is the only way that OneDrive™ performs such communications. When detecting an outgoing SSL communication from an application appearing to be OneDrive, if there is a corresponding API request, then the API request can be examined to determine whether the SSL communication is benign. If there is a call to the HttpSendRequest API from wininet.dll, standard techniques can be applied to determine whether or not the outgoing SSL communication is valid. If there is no call to the HttpSendRequest API from wininet.dll, then a conclusion can immediately be draw that the outgoing SSL communication is suspicious and further investigations may be made.

Figure 1:
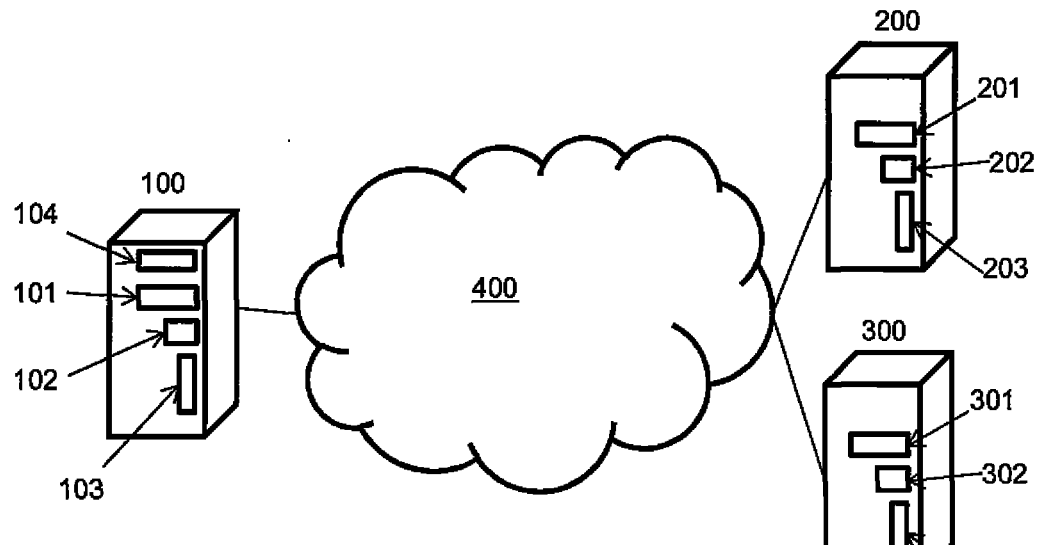
FIG. 1 is a schematic diagram of a system.

An embodiment of the invention will be described with reference to the system shown in FIG. 1. A client computer 100 has installed thereon a security application 104 provided by a security service provider. The computer runs a number of further applications, and the security application 104 monitors actions taken by those further applications. The client computer 100 may connect to a server 200, and the security application 104 sends results of the monitoring to the server 200 for analysis, or the analysis may be performed at the client computer 100 by the security application. The behaviour profiles may be constructed at the client 100 by the security application 104, at the server 200, or at a second server 300. The client computer 100 and the servers 200 and 300 each typically comprise a hard drive 101, 201, 301, a processor 102, 202, 302, and RAM 103, 203, 303. The client computer 100 may connect to the servers 200 and 300 over the Internet 400, or any suitable network. The servers 200 and 300 (if used) are operated by the security service provider.

As discussed above, a known benign application may be caused to run additional code either by malware modifying the files of the application on the hard drive (parasitic file infection) or by injecting code into the application as it runs, e.g. by causing the application to process invalid data in such a way that the data is queued for execution in the RAM. Alternatively, a malicious application may be constructed so that it appears to be a known benign application to anti malware applications and/or to the user, e.g. by using the same file names as a known benign application, and copying certain behaviour of the known application whist keeping the malicious behaviour obscured. In any case, an application which appears (on first inspection) to the security application 104 to be a known benign application, is caused to run malicious code. Without further preventative measures, this potentially allows the malware to bypass more intensive malware scans if the security application is configured not to perform such scans on known benign applications. Alternatively, it may allow the malware to operate at higher privilege levels on the client computer than would otherwise be possible.

Figure 2:
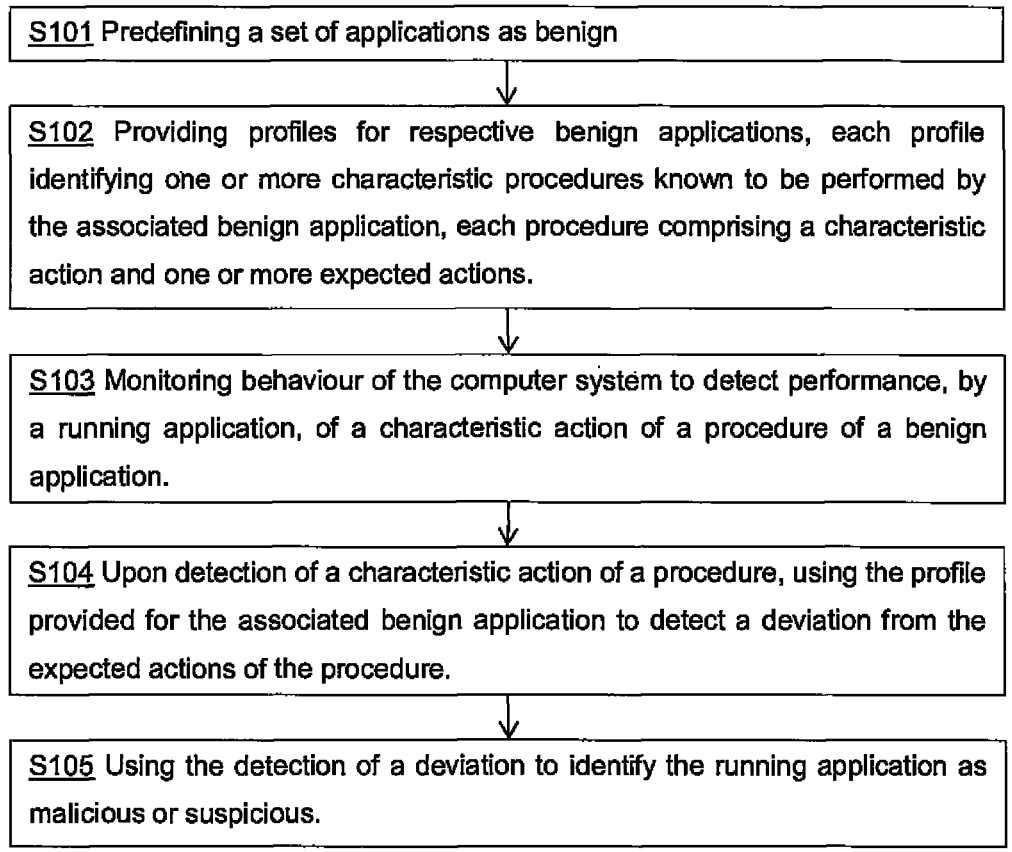
FIG. 2 is a flowchart of a malware protection method according to an embodiment.

FIG. 2 is a flowchart of a method of detecting malware. The security application identifies a number of applications as benign, S101 ("known benign applications"). For each such application, the security application maintains identification information for the application such as filenames, hash data, certificates, etc. The security application further maintains a behaviour profile for each of the known benign applications S102. The behaviour profile for an application identifies how the application implements one or more procedures, for example how an SSL or other secure connection is established, how the application edits registry entries, or any other operation such as file access, network access or memory related operations. The profile identifies, for each procedure, a characteristic action (which will typically be the action which is the result of the procedure) and one or more expected actions. For example, in the case of an SSL connection, the characteristic action may be the sending of an SSL encrypted message, and the expected actions may include a call to a library which provides an SSL implementation.

As a further example, the characteristic action may be the editing of a registry entry. The API used to perform this action will generally be the same regardless of implementation, but there is a detectable difference in the actions preceding the registry edit depending on the programming language in which the code is written, and possibly on the compiler used. Code written in a compiled language such as C++™ will be executed immediately. Code written in a script language such as Python™ will be interpreted at runtime by an interpreter. Code written in languages such as VisualBasic™ is passed as bytecode specific to that language to an interpreter, which then "translates" the code so that it can be executed by the processor. The expected actions for a program where the registry editing functions are written in VisualBasic™ would include interpretation of the VisualBasic bytecode, and the absence of this action indicates that code in a compiled language is being run, which suggests that code has been added to the application.

The actions may be anything which is done by the application or other software or hardware on the computer system as part of the procedure. The procedures may include file, registry, memory, and/or network operations.

Behaviour of the computer system is monitored when a benign application appears to be running S103. This monitoring is used to detect performance of a characteristic action of a procedure of the application, as defined in the profile. A log of results of the monitoring will be stored by the security application so that previous actions taken can be compared to the expected actions in the profile when a characteristic action is detected.

When the behaviour monitoring believes that it has detected that a known benign application has performed the characteristic action of a procedure described in the application's profile, the profile of the application is used to detect any deviation from the expected actions S104. This may be done by comparing results of the monitoring against the expected actions in the profile, and identifying any actions performed as part of the procedure which are not expected actions, and/or any expected actions which are not performed. Any deviation from the expected actions is used to flag the application as malicious or suspicious (S105), i.e. the application may be compromised (e.g. by injection of malicious code), or the application may be a malicious application pretending to be the application identified in the behaviour profile.

Deviation from the expected actions may include the presence of additional actions, or the absence of expected actions. For example, the Tor™ browser implements its privacy protocols without the use of system APIs, which means the data cannot be accessed by other applications. However, a malicious version of the Tor™ browser which is designed to allow access to private data may implement the Tor™ protocol in a way which presents the data in a hookable form. Therefore, when the characteristic action of network traffic sent via the Tor™ protocol is detected, any hookable data related to that traffic can be taken as a deviation from the expected actions.

In the event that an application is flagged as malicious or suspicious, a further malware scan may be performed on the application to determine whether the procedure resulted from code injection or whether the application itself comprises malicious code. In any case, once the running application has been identified as malicious or suspicious, further action may be taken to remove or reduce the threat. The type of response will depend on the type of attack. For a code injection attack, it may be sufficient to terminate the process, or just the procedure, as there may not be any permanent alteration to the application. For malware attacks where the application itself has been modified, or for malware which appears to be a benign application, the malicious application may be quarantined, deleted or otherwise made safe.

In the event that malware authors are aware of the approach described above, they may try to circumvent the approach by using procedures which are closer to those of the known benign applications. However, this then leads them back to attacks which are generally more open to conventional behavioural analysis techniques, e.g. they must rely on establishing an SSL connection in such a way that plaintext is exposed. If on the other hand malware authors choose to avoid procedures employed by the known benign applications altogether, then the operation of the malware will be compromised.

The application behaviour profile may be created on the "back end", i.e. by a security service provider and provided to the security application at the client computer. This profiling may be performed by an automated and/or manual analysis of known benign applications. A set of characteristic actions relating to suitable procedures, performed by an application, may be specified and the application then analysed to determine characteristic and expected actions. The analysis may include receiving behavioural monitoring information from each of a plurality of client computers on which the application is running, and determining the characteristic and expected actions from the aggregated results of the behavioural monitoring. In the event that a set of actions within the behavioural monitoring is only experienced by a small proportion of the client computers, this set of actions may be the result of malicious code, and can be recorded in the behavioural profile as a violation of the profile.

Alternatively, the application behaviour profile may be created at the client computer, but this does introduce a risk that a false profile will be created if malware is already present. In order to create the profile, the application may be run in a sandbox by the security application installed on the client computer, or the behaviour of the application may be monitored during normal use of the computer. In order to mitigate the risks of creating the profile at the client computer, the application may be subject to intensive behavioural analysis techniques while the profile is being created.

As a further alternative, the behaviour profile may be created either at the client computer or the server by examining the binary code of the application. The code is examined to look for characteristic actions of interest, and to determine which expected actions would be associated with those characteristic actions. The code as stored on disk is analysed, rather than the code in memory when the program is being executed, in order to exclude code that could be added to the execution of the application by a code injection attack.

Prior to performing any of the above analyses, the application may be identified as a known benign application by comparing it to identification information of the benign application. For example, the application may be compared to a hash of a known benign application, or a digital signature of the application may be examined to determine that it is valid and issued by a trusted source.

The behaviour monitoring S103 may be performed by a stand-alone software module of the security application which hooks into various behaviours of the applications, or by a plugin, installed into the known benign applications, by the security application: a combination of both approaches may also be used. The monitoring may comprise kernel-mode and/or user-mode hooks, and/or hooking other calls to or from the application such as Browser Helper Objects or parts of the application API which provide information to other applications, e.g. plugins. The monitoring may include monitoring API calls made by the application and/or information available through the application's own API.

For example, monitoring of the Chrome™ browser may be performed by a plugin for the browser and a stand-alone module which monitors outgoing network traffic. If the stand-alone module sees an outgoing SSL connection from Chrome™, then it notifies the security application. The security application then determines whether the plugin observed a corresponding SSL communication via the Chrome API. If such an SSL communication was observed, then it is subject to known behavioural analysis techniques. If no such communication was seen, then the SSL connection is identified as being the result of the execution of malicious or suspicious code.

The behaviour monitoring S103 and detection of characteristic and expected actions S104 may be performed at the client computer. Alternatively, the client computer may monitor the behaviour of the application S103, and send details of monitored actions to a server, along with identification information for the monitored application. The information may be sent periodically, or only when characteristic actions are detected S103 (e.g. detecting an SSL connection may cause the client computer to send details of the behaviour leading up to the SSL connection to the server). The server maintains a database of application profiles S102, and detects characteristic actions S103 (if not already detected by the client), and any deviations from the expected actions S104. The detection is carried out as described above. If the analysis identifies the application running on the client computer as malicious or suspicious S105, then the server notifies the client computer, and may specify a response to be performed.

Upon detection of a procedure which is not performed according to an application profile, details of the actions performed around the same time as the characteristic action may be recorded. This information may be used to generate signatures for behavioural monitoring to detect the malware, or to construct a new profile if it is determined that the procedure is in fact benign.

The behaviour monitoring may be performed if the application is only a partial match for the identification information in the profile, e.g. if the application has the correct filename and digital signature, but a hash of the application executable does not match the profile. Such a partial match could indicate either a maliciously modified application, malware which is impersonating an application, or a legitimate update to an application. Application updates are unlikely to significantly alter the way that an application performs a procedure, and as such any deviation from the application profile could indicate that the apparently benign application in fact contains malware.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A method of detecting malware present on a computer system, the method comprising:
   a) predefining a set of applications as benign;
   b) providing profiles for respective benign applications, each profile identifying one or more procedures known to be performed by the associated benign application, each procedure being identified by a characteristic action and one or more expected actions;
   c) monitoring behaviour of the computer system when a benign application appears to be running;
   d) maintaining a log of actions;
   e) detecting performance, by the running application, of a characteristic action of a procedure defined for the benign application;
   f) upon detection of performance of a characteristic action, using the profile provided for the associated benign application, and said log of actions, to detect a previous deviation from the expected actions of the procedure; and
   g) using the detection of a deviation to identify the running application as a modified version of a benign application or an application masquerading as a benign application and therefore as being malicious or suspicious.

2. A method according to claim 1 and comprising, at step c), identifying the benign application using identifying information stored with the associated profile.

3. A method according to claim 2, wherein the identifying information comprises any one or more of:
   a hash of the benign application; and
   a digital signature and/or certificate associated with the benign application.

4. A method according to claim 3 and comprising, at step g), identifying the running application as one of:
   the benign application running injected code; and
   a malicious modification of the benign application.

5. A method according to claim 4, wherein the running application is identified as the benign application running injected code in the case where the application matches said identification information, and as a malicious modification of the benign application where the application matches only a part of said identification information.

6. A method according to claim 1, wherein all of the steps are performed at the computer system.

7. A method according to claim 1, wherein steps c) and e) are performed at the computer system, and steps b), f) and g) are performed at a server, and comprising:
   upon detection of performance of a characteristic action, sending from the client computer to the server, details of the characteristic action and other actions taken on the client computer; and
   sending from the server to the computer system, an indication as to whether or not the running application is malicious or suspicious.

8. A method according to claim 7, and comprising, upon detection of a deviation at step f), sending from the server to the computer system, instructions for handling the running application.

9. A method according to claim 1, wherein said procedures include any one or more of:
   establishment of a secure session;
   communication over a secure session;
   file operations;
   registry operations;
   memory operations;
   network operations.

10. A method according to claim 1, wherein the characteristic and/or expected actions include one or more of:
    API calls made by the running application;
    information made available to plugins of the running application;
    actions relating to Browser Helper Objects;
    file access operations performed by the running application;
    network operations performed by the running application;
    encrypted communications sent by the running application.

11. A method according to claim 1 and comprising, at step g), handling the running application by one or more of:
    terminating a process of the running application;
    terminating the characteristic action or an action resulting from the characteristic action;
    removing or otherwise making safe the running application; and
    performing a further malware scan on the application.

12. A method according to claim 1, wherein step b) comprises generating a profile for a benign application by one or both of:
    monitoring the behaviour of the benign application running on a plurality of client computers and identifying procedures and respective characteristic and expected actions from the aggregate results; and
    performing a static analysis of binary code associated with the benign application.

13. The method according to claim 1, wherein the running application does not run in a sandbox.

14. A computer system comprising:
    a memory configured to store a profile for each of a set of benign applications, the profile identifying one or more procedures known to be performed by the associated benign application, each procedure being identified by a characteristic action and one or more expected actions;
    a processor configured to:
    monitor behaviour of the computer system when a benign application appears to be running and maintain a log of actions;

detect performance, by the running application, of a characteristic action of a procedure defined for the benign application;

upon detection of performance of a characteristic action, use the profile provided for the associated benign application and said log of actions to detect a previous deviation from the expected actions of the procedure; and use the detection of a deviation to identify the running application as a modified version of a benign application or an application masquerading as a benign application and therefore as being malicious or suspicious.

15. A server comprising:

a memory configured to store a profile for each of a set of benign applications, the profile identifying one or more procedures known to be performed by the associated benign application, each procedure being identified by a characteristic action and one or more expected actions;

a processor configured to:

receive, from a computer system, results of behaviour monitoring of a running application on the computer system including a log of actions;

upon detection of performance of a characteristic action in said results, use the profile provided for the associated benign application and said log of actions to detect a previous deviation from the expected actions of the procedure; and use the detection of a deviation to identify the running application as a modified version of a benign application or an application masquerading as a benign application and therefore as being malicious or suspicious;

send to the computer system an indication as to whether the running application is malicious or suspicious.

16. A server according to claim 15, wherein the results comprises an explicit indication of detection of a characteristic action.

17. A computer program product comprising a non-transitory computer readable medium and a computer program comprising computer readable code which, when run on a computer system, causes the computer system to:

store a profile for each of a set of benign applications, the profile identifying one or more procedures known to be performed by the associated benign application, each procedure being identified by a characteristic action and one or more expected actions monitor behaviour of the computer system when a benign application appears to be running and maintaining a log of actions;

detect performance, by the running application, of a characteristic action of a procedure defined for the benign application;

upon detection of performance of a characteristic action, use the profile provided for the associated benign application, and said log of actions, to detect a previous deviation from the expected actions of the procedure; and use the detection of a deviation to identify the running application as a modified version of a benign application or an application masquerading as a benign application and therefore as being malicious or suspicious;

wherein the computer program is stored on the computer-readable medium.

18. A computer program product comprising a non-transitory computer readable medium and a computer program comprising computer readable code which, when run on a server, causes the server to:

store a profile for each of a set of benign applications, the profile identifying one or more procedures known to be performed by the associated benign application, each procedure being identified by a characteristic action and one or more expected actions receive, from a computer system, results of behaviour monitoring of a running application on the computer system when a benign application appears to be running, these results including a log of actions;

upon detection of performance of a characteristic action in said results, use the profile provided for the associated benign application, and said log of actions, to detect a previous deviation from the expected actions of the procedure; and use the detection of a deviation to identify the running application as a modified version of a benign application or an application masquerading as a benign application and therefore as being malicious or suspicious;

send to the computer system an indication as to whether the running application is malicious or suspicious wherein the computer program is stored on the computer-readable medium.

* * * * *